Patented Feb. 4, 1941

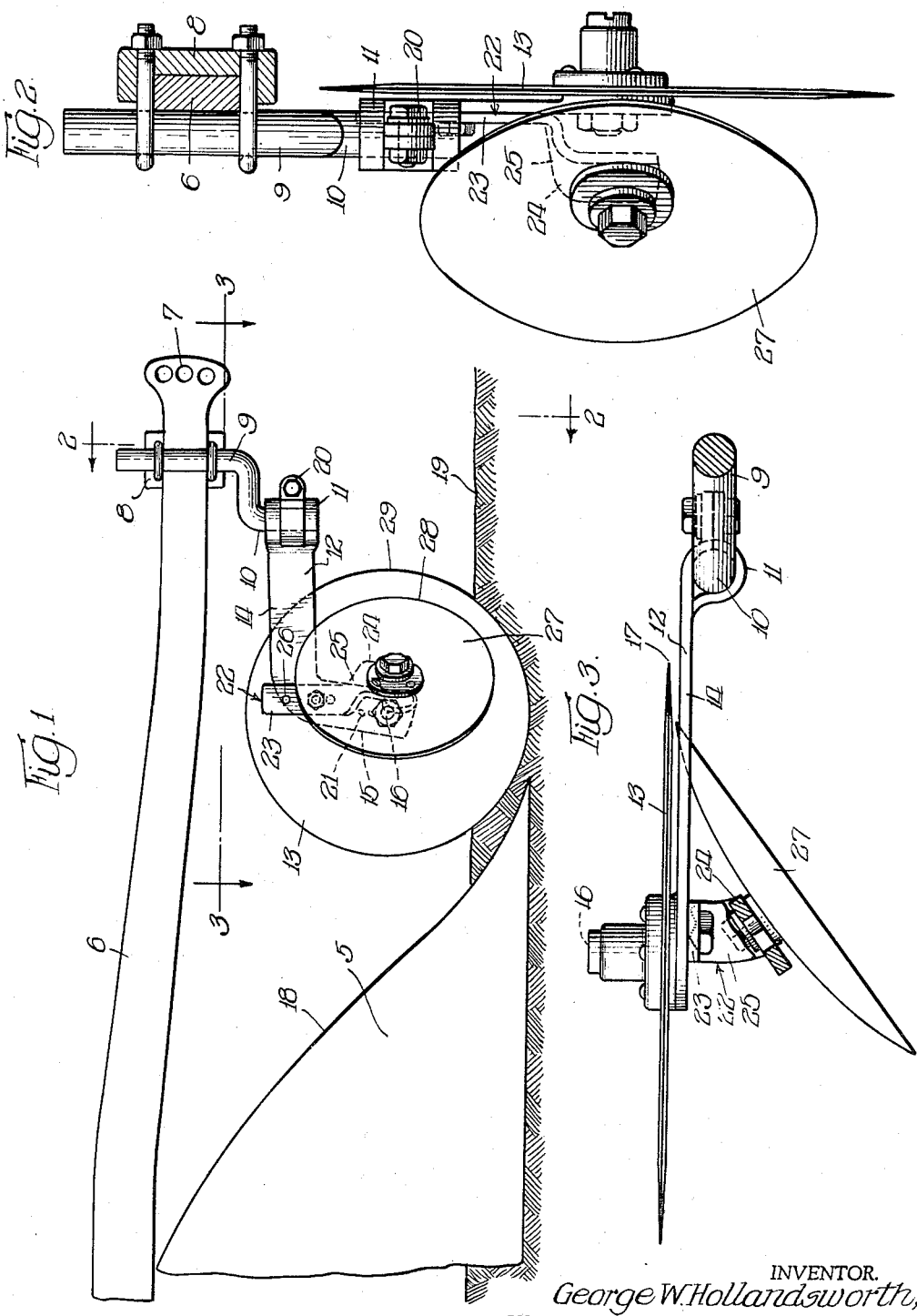

2,230,750

UNITED STATES PATENT OFFICE 2,230,750

FARMING IMPLEMENT

George W. Hollandsworth, Knox, Ind., assignor to Brice H. Lantz, Valparaiso, Ind.

Application June 3, 1939, Serial No. 277,211

9 Claims. (Cl. 97—209)

This invention relates to farming implements, and the primary object of the present invention is the provision of new and novel means comprising a rotary spreader disc member located at an angle laterally to a coulter blade and having its cutting edge adjacent the leading edge of the coulter blade, the coulter blade being mounted forward of the leading edge of the plow and having an offset connection to compensate for the drag or side draft created by the spreader disc because of its action in the soil, whereby the coulter blade will be in proper alinement with the plow during operation.

A further object of the invention is the provision of an adjustable coulter blade mounted on an arm which extends upwardly and forwardly at an angle from the axis of the coulter blade so as to give freedom of action thereto, to cause debris, such as corn stalks and the like, to pass through freely and not become tangled or lodged on or against the support, there being an adjustably mounted spreader disc located in juxtaposition with respect to the coulter blade to spread the earth properly, to steer or position stalks and other debris to the cutting plane of the coulter blade, as well as to effect a cutting action on the debris and give directional movement to the debris.

Still another object of the invention is the provision of new and novel means adjustably mounted with respect to a coulter blade to effect an earth spreading action at a point forwardly of the coulter center, and to sever debris in its path and then direct it so as to be plowed under by the rearwardly disposed plow.

A still further object of the invention resides in the adjustability of the coulter blade, the mounting of the coulter blade with respect to the plow, the location, mounting and adjustability of the spreader disc with respect to the coulter blade, and the arrangement and location of the various parts.

Another object of the invention is the provision of a spreader disc arranged in such a way adjacent a coulter blade that the spreader disc will cause any stalks not originally cut by the coulter blade to be pulled sideways and torn apart in such a manner that they will be brought to position and be in proper lengths so as to be furrowed or plowed into the ground by the plow.

Another object is the provision of an implement or accessory which is adapted to be applied to a grain drill, corn planter, plow and the like, the same being detachable, made of few and simple parts, and capable of positive and efficient operation.

Numerous other objects and advantages will be apparent throughout the progress of the following specification.

The accompanying drawing illustrates a selected embodiment of the invention and the views therein are as follows:

Fig. 1 is a detail elevational view of a plow construction and embodying the invention;

Fig. 2 is a detail vertical sectional view on the line 2—2 of Fig. 1; and

Fig. 3 is a detail sectional view on the line 3—3 of Fig. 1.

The implement herein shown for the purpose of illustrating the invention is attached to an agricultural implement such as a plow 5 which may be of the conventional plowshare and moldboard type or it may be the disc plow type. The plow 5 is operatively connected in the usual manner to a plow beam 6, there being connecting means 7 provided at the forward end of the plow beam 6 to permit connection to a tractor or other means for pulling the plow. A clamp 8 rigidly but adjustably supports an arm 9 which may be in the form of a bell crank, as shown, the construction being such to permit vertical adjustment. The lower arm 10 extends into a bearing 11 on the bracket arm 12, to which arm a coulter blade 13 is adjustably connected.

The arm 12 comprises a relatively straight portion 14 and a downwardly extending inclined portion 15 whereby all the connections to the coulter blade 13 extend or project upwardly from the center or axis 16 of the coulter blade, thereby permitting greater freedom of action of the coulter blade and preventing debris, such as stalks and the like, from tangling or bunching up underneath the supporting arm 14, a condition which would occur were the coulter support of the usual bifurcated arm extending horizontally to the axis of the coulter blade.

The bearing 11 is offset from the leading or working edge 17 of the coulter 13, there being a bearing or eye formed to receive the arm 10 of the bell crank 9. This bearing or eye is located to one side of the longitudinal plane of the coulter blade to offset the coulter blade to a certain extent for a purpose to appear later.

The coulter blade 13 is adapted to be positioned so that its normal circular cutting edge will be substantially in front of the plow sheath 18 and in normal alinement therewith. This coulter blade extends a predetermined distance below the ground line 19, and its purpose is to cut and chop up any debris, such as corn stalks and the like, so that it may be covered by the earth spread in the making of a furrow by the plow 5.

The arm 14 is rotatably secured to the arm 10 of the bell crank 9 but its rotatable movement is limited so that it will not swing all the way around when the plow backs up. Vertical adjustment may be accomplished through the connection of the engaging arm 10 of the bell crank with the collar 20, but vertical adjustment is preferably accomplished by raising or lowering the upper end of the bell crank in the clamp 8. The connection of the collar 20 to the arm 10 permits limited swinging movement about the pivot or arm 10.

The extension 15 on the arm 14 may be provided with any kind of adjustment means to permit vertical and horizontal movement of the coulter blade 13 with respect to its locking pivot or axis 16. Also, the coulter blade 13 may have lateral movement along its shaft 16 whereby the coulter blade itself may have vertical, lateral and horizontal adjustability with respect to its fastening connection to the arm 14. This adjustment means is indicated by the numeral 21, Fig. 1.

A spreader arm 22 is adjustably connected to the arm 14, and this arm comprises a relatively straight vertical portion 23, a relatively straight lower portion 24 which is located at an angle with respect to the arm 23, and a connection portion 25 which may be constructed so as to provide the straight angular portion 24. The arm 22 may be provided with adjustment means 26 so as to permit vertical adjustment of the arm 22 with respect to the arm 14. The adjustment means 26 may comprise any known means so that the arm 22 may be adjusted horizontally, vertically or angularly with respect to the arm 14.

A spreader disc 27 is rotatably supported on the lower flat portion 24 of the arm 22 and is adapted to have movement toward and away from the coulter blade 13, as well as vertical movement on the part 24. The spreader disc 27 may be dished, and is located at an angle with respect to the coulter blade 13. The forward, leading or cutting edge 28 of the spreader disc 27 is located immediately behind the forwarding, leading or cutting edge 29 of the coulter blade 13, and the purpose of this spreader disc is to part any straw, corn stalks, etc., which the coulter blade fails to cut off and pull them sideways at the same time the coulter blade is holding them. The result is a combined pulling and cutting effect whereby the stalks and other debris are broken apart and positioned to be furrowed under by the plow.

The spreader disc 27 is situated adjacent the coulter blade 13, and while both the blade and disc are shown mounted on axles which are relatively co-axial, it is of course understood that the axis of one may be positioned above, below, forward or rearward of the axis of the other. Too, the spreader disc may be larger than the coulter blade, the same size, or the coulter blade may be the larger in size. It is of prime importance, however, that the spreader disc be inclined laterally with respect to the normal plane of the coulter blade so that stalks or other debris not cut by the coulter will be forced in a predetermined direction and torn apart by pulling from the two directions and then later furrowed into the ground by the plow.

As previously mentioned, the normal line of the cutting edge of the coulter blade is offset or set to one side by the pulling arm so as to compensate for the side draft or drag created by the spreader disc, so that during normal operation the spreader disc creating a drag by its action in the soil will tend to shift the coulter blade in an opposite direction. Therefore, the spreader disc will cause the coulter blade to be positioned properly and in substantial alinement in front of the leading edge of the plow.

The invention contemplates the use of a spreader disc situated laterally and at an angle to an offset coulter blade so as to cause the coulter blade to be alined properly as regards a rearwardly positioned plow element. Also, the side drag created by the spreader disc will offset or compensate for the offset position of the coulter blade and cause the coulter blade to lead the plow properly and run in a straight line. The coulter arm is adapted for adjustment with respect to the plow beam, and the coulter blade is adapted for horizontal and vertical adjustment with respect to the coulter arm. Also, the spreader disc is capable of adjustment vertically as well as laterally and horizontally whereby the spreader disc may be moved forward, rearward, up and down as regards the coulter. Too, the angle of inclination of the spreader disc may be increased or decreased laterally or vertically as desired. The invention further contemplates the use of blades, plates or discs of various sizes, inclinations and adjustments, and the use of dished as well as flat surfaces. Moreover, the construction is such as to provide an attachment not only for plows but to grain drills, corn planters, and other similar articles as well.

Changes may be made in the form, arrangement and construction of the parts without departing from the spirit of the invention or sacrificing any of its advantages, and the right is hereby reserved to make all such changes as fairly fall within the scope of the following claims.

The invention is hereby claimed as follows:

1. A farming implement comprising a coulter blade offset laterally from the line of pull, and a spreader disc arranged adjacent the coulter blade to overcome or offset the drag or side draft created on the coulter blade because of the connection of the spreader disc.

2. A farming implement comprising a coulter blade, a coulter arm to which the blade is adjustably and revolubly mounted, a plow beam, offset means connecting the arm to the beam whereby the blade will tend to shift to one side of the plow beam when the plow beam is pulled or moved in a forward direction, and a spreader disc laterally inclined with respect to the coulter blade and adjacent thereto to compensate for said offset connection and cause the coulter blade to move in a straight line when the said beam is moved in said direction.

3. A farming implement comprising a rotary circular coulter blade, a plow beam to which the coulter blade is operatively connected, and means connecting the blade to the beam, said means comprising an offset connection to cause the blade to shift to an angular position when the beam is pulled, and a spreader disc adjacent the coulter blade and creating a drag on the coulter blade during operation thereof to overcome said tendency to shift angularly.

4. A farming implement comprising a plow, a coulter blade leading the plow, a spreader disc laterally offset at an angle from the coulter blade and adjacent thereto and creating a drag on said coulter blade, means connecting the coulter blade to a part of the plow to allow and compensate for said drag and to overcome said drag, means for adjusting the coulter blade in several positions, and means for adjusting the spreader disc in various positions.

5. A farming implement comprising a rotatively mounted circular coulter blade, a coulter arm extending upwardly and forwardly at an angle from the axis of the blade, means to adjust the blade to various positions with respect to said arm, and a rotary disc situated at one side of the blade with its forward or leading edge adjacent the blade forwardly of the axis of the blade and extending at an angle, and means to adjust the spreader disc in various directions.

6. A farming implement for cutting through trash and debris such as corn stalks and the like and for covering with soil such debris after cutting, comprising a flat circular coulter blade adapted to be arranged forwardly of a plow, and a circular concavo-convex spreader disc arranged at an angle to the coulter blade, the leading edge of the spreader disc being disposed rearwardly of the leading edge of the coulter and forwardly of the center thereof.

7. A farming implement adapted to be arranged forwardly of a plow and comprising a substantially flat circular coulter blade, and a substantially concavo-convex spreader disc arranged at an angle to the coulter blade, the leading edge of the spreader disc lying adjacent the coulter blade at or rearwardly of the leading edge of the coulter blade but forwardly of the center of said coulter blade.

8. A farming implement for cutting surface refuse and tucking the refuse after being cut under the soil and comprising a bracket arm to which the implement may be operatively connected to a plow or other farming device, a circular substantially flat coulter blade operatively mounted on the bracket arm for rotation, and a circular substantially concavo-convex spreader disc operatively and adjustably carried by the bracket arm for rotation and having its convex surface facing the coulter blade, the normal plane of the spreader disc being disposed at an angle to the normal plane of the coulter blade, the leading edge of the spreader disc being positioned forwardly of the center of the coulter blade but not forwardly of the peripheral leading or cutting edge of the coulter blade, the leading edge of the spreader disc being disposed adjacent and lying close to the side of the coulter blade.

9. A new article of manufacture comprising a unit adapted to be operatively connected to a farming implement and comprising a bracket having provision on one end thereof for permitting attachment to the farming implement, a substantially flat circular coulter blade operatively carried by the other end of the bracket arm for rotation, and a substantially concavo-convex circular spreader disc operatively carried by the bracket for rotation with the convex side of the spreader disc facing the coulter blade but disposed at an angle thereto, the leading edge of the spreader disc lying close to a face of the coulter blade but disposed rearwardly of the leading edge of the coulter blade a predetermined distance but forwardly of the axis of rotation of the coulter blade.

GEORGE W. HOLLANDSWORTH.